(12) United States Patent
Higgins et al.

(10) Patent No.: US 9,527,430 B2
(45) Date of Patent: Dec. 27, 2016

(54) VEHICLE HEADLIGHT LEVELING CONTROL

(71) Applicant: Toyota Motor Engineering & Manufacturing North America, Inc., Erlanger, KY (US)

(72) Inventors: Christopher M. Higgins, Ypsilanti, MI (US); Christopher G. Grant, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 58 days.

(21) Appl. No.: 14/455,963

(22) Filed: Aug. 11, 2014

(65) Prior Publication Data

US 2016/0039332 A1   Feb. 11, 2016

(51) Int. Cl.
*B60Q 1/00* (2006.01)
*B60Q 1/115* (2006.01)
*B60Q 1/076* (2006.01)

(52) U.S. Cl.
CPC ............ *B60Q 1/115* (2013.01); *B60Q 1/076* (2013.01); *B60Q 2300/21* (2013.01)

(58) Field of Classification Search
None
See application file for complete search history.

(56) References Cited

U.S. PATENT DOCUMENTS

| | | | | |
|---|---|---|---|---|
| 3,728,538 | A | * | 4/1973 | Bailly .................. B60Q 1/11 362/469 |
| 3,790,771 | A | * | 2/1974 | Tixier .................. B60Q 1/105 362/469 |
| 3,859,516 | A | * | 1/1975 | Tuzson ................ B60Q 1/105 362/468 |

(Continued)

FOREIGN PATENT DOCUMENTS

| | | |
|---|---|---|
| EP | 0497039 A1 | 8/1992 |
| EP | 0584942 A2 | 7/1993 |
| EP | 0579882 A1 | 1/1994 |

OTHER PUBLICATIONS

Vehicle Drivers Manual, 4-3. Operating the Lights and Wipers, Undated, in 1 page.

(Continued)

*Primary Examiner* — John R Olszewski
*Assistant Examiner* — Navid Ziaeianmehdizadeh
(74) *Attorney, Agent, or Firm* — Christopher G. Darrow; Darrow Mustafa PC

(57) ABSTRACT

Vehicle headlight leveling methods and systems provide occupants of a vehicle the ability to manually adjust headlight level in an efficient and intuitive manner. In some embodiments, a user may supply a current vehicle loading condition to an input such as a vehicle information or entertainment system. The system may determine a headlight level setting based on the received loading condition using an in-vehicle processor and/or memory. A signal indicative of the headlight level setting may be sent to a (Continued)

headlight leveling device to change the orientation of the vehicle headlight in relation to the body of the vehicle. Some embodiments may prompt a user to input a vehicle loading condition if the vehicle recognizes changed vehicle characteristics.

19 Claims, 5 Drawing Sheets

(56) References Cited

U.S. PATENT DOCUMENTS

| | | | | |
|---|---|---|---|---|
| 4,013,883 | A * | 3/1977 | Andres | B60Q 1/105 362/385 |
| 4,110,819 | A * | 8/1978 | Ishikawa | B60Q 1/068 362/233 |
| 4,180,848 | A * | 12/1979 | Schwerin | B60Q 1/105 362/468 |
| 4,194,235 | A * | 3/1980 | Heinlein | B60Q 1/105 362/269 |
| 4,733,334 | A * | 3/1988 | Krey | B60Q 1/06 362/463 |
| 4,781,465 | A * | 11/1988 | Demachi | B60G 17/0165 356/3.07 |
| 5,787,370 | A | 7/1998 | Kutscher et al. | |
| 5,907,196 | A * | 5/1999 | Hayami | F21S 48/1742 307/10.8 |
| 5,962,980 | A * | 10/1999 | Kluge | B60Q 1/115 307/10.8 |
| 6,144,159 | A * | 11/2000 | Lopez | B60Q 1/0023 315/82 |
| 6,193,398 | B1 * | 2/2001 | Okuchi | B60Q 1/115 362/276 |
| 6,229,263 | B1 * | 5/2001 | Izawa | B60Q 1/115 315/80 |
| 6,234,654 | B1 * | 5/2001 | Okuchi | B60Q 1/10 362/276 |
| 6,357,898 | B1 * | 3/2002 | Toda | B60Q 1/115 362/464 |
| 6,445,085 | B1 | 9/2002 | Toda et al. | |
| 6,663,268 | B1 * | 12/2003 | Toda | B60Q 1/115 362/271 |
| 7,014,345 | B2 | 3/2006 | Toda | |
| 7,054,730 | B2 * | 5/2006 | Izawa | B60Q 1/10 315/82 |
| 7,104,664 | B2 * | 9/2006 | Sugimoto | B60Q 1/12 362/36 |
| 7,239,951 | B2 | 7/2007 | Sugimoto et al. | |
| 7,350,944 | B2 * | 4/2008 | Yamazaki | B60Q 1/10 362/276 |
| 8,602,618 | B2 * | 12/2013 | Ahn | F21S 48/1127 362/465 |
| 8,716,935 | B2 * | 5/2014 | Nakazawa | B60Q 1/10 307/10.8 |
| 2002/0045978 | A1 * | 4/2002 | Nishimura | B60Q 1/115 701/49 |
| 2005/0047152 | A1 * | 3/2005 | Okumura | B60Q 1/115 362/464 |
| 2006/0267502 | A1 * | 11/2006 | Kubota | B60Q 1/143 315/82 |
| 2007/0268159 | A1 * | 11/2007 | Futamura | B60Q 1/143 340/933 |
| 2008/0247177 | A1 * | 10/2008 | Tanaka | F21S 8/026 362/373 |
| 2009/0086496 | A1 * | 4/2009 | Todani | B60Q 1/10 362/465 |
| 2012/0272193 | A1 * | 10/2012 | Michaelis | B60K 37/06 715/863 |
| 2013/0320783 | A1 * | 12/2013 | Huang | H02K 37/24 310/48 |
| 2014/0301094 | A1 * | 10/2014 | Ehlgen | B60Q 1/115 362/466 |

OTHER PUBLICATIONS

Toyota, Toyota 2014 Tundra Quick Reference Guide, 2014 (19 pages).
Toyota, Toyota 2014 Tundra Quick Reference Guide, "Overview", 2014, pp. 2-5 (2 pages).
Toyota, 2014 Tundra Owner's Manual, Section 2, "Instrument cluster", 2014, pp. 93-98 (6 pages).
Toyota, 2014 Tundra Owner's Manual, Section 4-3, "Operating the lights and wipers", 2014, p. 190 (1 page).
Toyota, 2014 Tundra Owner's Manual, Section 5-2, "Setup", 2014, pp. 256-261 (6 pages).
Toyota, 2014 Tundra Owner's Manual, Section 9-2, "Customization", 2014, pp. 530-534 (5 pages).
Toyota, 2014 Tundra Owner's Manual, 2014 (576 pages).

* cited by examiner

VEHICLE HEADLIGHT LEVELING CONTROL

BACKGROUND

The present disclosure relates to vehicle headlights, and more particularly, to headlight leveling control methods and systems.

Motor vehicles are generally equipped with headlights that are incorporated near the front of a vehicle to assist occupants of the vehicle to see conditions exterior to the vehicle and to allow other vehicles and pedestrians to clearly see the vehicle.

Headlights may be installed to provide particular light projection to surrounding vehicle environments. Headlight intensity and direction are designed to provide an optimal amount of illumination to vehicle surroundings while still ensuring the comfort of other vehicle occupants. Under certain loading conditions, such as increased occupants or hauling or towing cargo, the pitch angle of the vehicle may change resulting in undesirable headlight projection that may lead to poor illumination of surrounding environments and/or discomfort for occupants of nearby vehicles.

Headlight leveling systems have been developed to allow for the angle of light projection to be changed depending on the load conditions of the vehicle. Some systems use a manual control located near a steering wheel, and may be unintuitive to an occupant, hard to use, and require external references to properly select headlight level. Such systems generally utilize a physical switch near the steering controls with several numeric values for each setting, such as 0-5. '0' may represent the setting without adjustment for loading conditions, and '5' may represent the maximum adjusted aim setting in the down direction. When the vehicle is loaded, a user would then be required to reference an external calculation or table to select the correct headlight level setting, or be forced to guess on their own as to which setting is correct.

Automatic headlight leveling systems have been developed that require the use of sensors that determine vehicle conditions, but such systems may be undesirable due to cost and weight.

It will be desirable to provide manual vehicle headlight leveling controls that are easily understood and accessed by occupants of a vehicle that utilize existing vehicle components and systems to reduce the likelihood that the vehicle is operated with undesirable headlight levels.

SUMMARY

Systems and methods for vehicle headlight leveling are disclosed that allow for intuitive manual adjustment of headlight levels. Some embodiments may include an input device incorporated into existing vehicle systems and may include graphical or textual representations of vehicle loading conditions. The correct headlight leveling setting may be determined by in-vehicle computing systems based on inputted vehicle loading conditions, and the setting may be automatically outputted to a headlight level control mechanism. The system or method may also prompt an occupant to adjust the headlight level in certain circumstances.

In one embodiment, a headlight leveling system for a vehicle includes an input device adapted to receive an input from an occupant of the vehicle relating to a loading condition of the vehicle, a memory with instructions stored therein, a processor in communication with the input device and the memory, wherein the processor determines a headlight level setting based upon the input and the instructions stored on the memory and outputs a headlight level setting signal, and an adjusting device adapted to change an orientation of a light emitting portion of a vehicle headlight assembly based on the headlight level setting signal.

In another embodiment, a computing device for a vehicle may include one or more processors for controlling operations of the computing device and a memory storing data and instructions used by the one or more processors. The one or more processors may execute instructions stored in the memory to receive an input from an input device in the vehicle corresponding to a vehicle loading condition, determine a headlight level setting based on the input, and output a signal to an adjusting device indicative of the headlight level setting, wherein the adjusting device is adapted to change an orientation of a light emitting portion of a vehicle headlight assembly.

In yet another embodiment, a computer-implemented method for vehicle headlight leveling may include the steps of receiving, by an input device, an input relating to a vehicle loading condition, determining, by a processor in response to instructions stored on a tangible non-transitory computer readable medium and the input, a headlight level setting, and outputting a headlight level setting signal to an adjusting device, the adjusting device adapted to change the orientation of a portion of a headlight assembly of a vehicle.

BRIEF DESCRIPTION OF THE DRAWINGS

The various features, advantages, and other uses of the present headlight leveling systems and methods will become more apparent by referring to the following detailed description and drawings in which.

DETAILED DESCRIPTION

Figure 1:
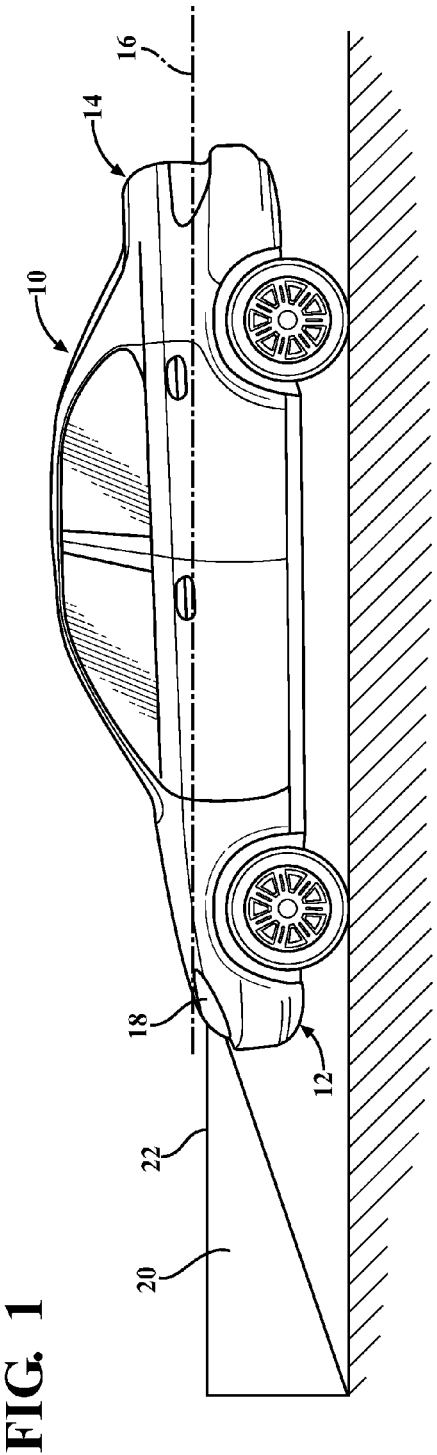
FIG. 1 is a side view of a vehicle with headlights illuminated in a normal loading condition.

Vehicle headlight leveling methods and systems provide occupants of a vehicle the ability to manually adjust headlight level in an efficient and intuitive manner. In some embodiments, a user may supply a current vehicle loading condition to an input such as a vehicle information or entertainment system. The system may determine a headlight level setting based on the received loading condition using an in-vehicle processor and/or memory. A signal indicative of the headlight level setting may be sent to a headlight leveling device to change the orientation of the vehicle headlight in relation to the body of the vehicle. Some embodiments may prompt a user to input a vehicle loading condition if the vehicle recognizes changed vehicle characteristics.

As used herein, the terminology "headlight" or "headlamp" includes any illumination device attached or incorporated within a vehicle to light surroundings ahead of a vehicle. Headlights may include assemblies adapted to produce both high and low beam settings.

As used herein, the terminology "memory" includes any computer-usable or computer-readable medium or device that can, for example, tangibly contain, store, communicate, or transport any signal or information for use by or in connection with any processor. Examples of computer-readable storage mediums may include one or more read only memories, one or more random access memories, one or more registers, one or more cache memories, one or more semiconductor memory devices, one or more magnetic media, such as internal hard disks and removable disks, one or more magneto-optical media, one or more optical media such as CD-ROM disks, and digital versatile disks (DVDs), or any combination thereof.

As used herein, the terminology "instructions" may include directions for performing any method, or any portion or portions thereof, disclosed herein, and may be realized in hardware, software, or any combination thereof. For example, instructions may be implemented as information stored in the memory, such as a computer program, that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. Portions of the instructions may be distributed across multiple processors on the same machine or different machines or across a network such as a local area network, a wide area network, the Internet, or a combination thereof.

As used herein, the terminology "example", "embodiment", "implementation", "aspect", "feature", or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Figure 2:
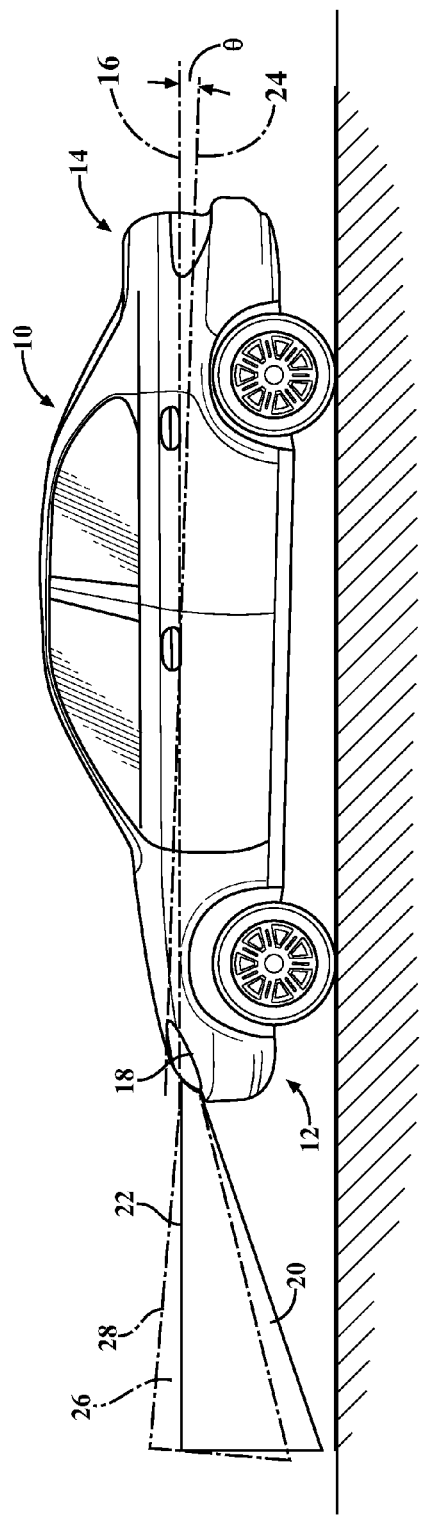
FIG. 2 is a side view of the vehicle with headlights illuminated in an altered loading condition.

Referring now to FIGS. 1-2, there is depicted a vehicle 10 with a front portion 12 and a rear portion 14. Vehicle 10 is shown as a four-door sedan automobile, but it is contemplated that embodiments disclosed herein may be incorporated into several vehicles, such as passenger automobiles, light and heavy duty trucks, commercial vehicles, ATVs, etc.

FIG. 1 is a side view of the vehicle with headlights illuminated in a normal loading condition. As used herein, a "typical" or "normal" loading condition may be defined as having minimal passengers and cargo and without towing external items. A horizontal axis 16 may be defined with relation to vehicle 10 in a static state, and may be substantially parallel to a surface that vehicle 10 may be traveling on. Vehicle 10 may typically include at least one headlight 18 adapted for illuminating a light beam or projection in front of vehicle 10. As shown in FIG. 1, during normal loading conditions headlight 18 may produce a correct beam 20 in a direction outward from vehicle 10. As shown, correct beam 20 may be one in which a top portion 22 of correct beam 20 extends substantially parallel to the ground or road surface. It is contemplated that other orientations are desired, such as requirements set by local or national regulations. Headlight assemblies described herein may be adjustable to alter or aim the pitch angle of a light source to change characteristics of light beams extending from headlight 18 in attempts to correct or move an undesirable beam projection towards correct beam 20.

Referring now to FIG. 2, vehicle 10 is shown having an altered loading condition wherein vehicle 10 has a different vehicle pitch angle than during normal loading conditions. The alternate loading condition may result from an increase of passengers or cargo within a passenger compartment of vehicle 10, the presence or increase of cargo within a trunk of vehicle 10, during towing of exterior items/trailers, or any combination thereof. As shown in FIG. 2, a pitched axis 24 may be offset from original axis 16 by pitch angle $\Theta$ to define the change in pitch angle due to vehicle loading conditions.

The difference in pitch angle $\Theta$ relative to axis 16 may result in undesirable beam 26 as shown in FIG. 2. Undesirable beam 26 may be angled relative to correct beam 20 at substantially the same angle as pitch angle $\Theta$. An undesirable top portion 28 of undesirable beam 26 may extend upwards away from the road surface and may result in undesirable conditions for occupants of nearby vehicles. For example, the undesirable beam 26 may shine into passenger compartments of oncoming vehicles resulting in reduced visibility or discomfort for occupants of the other vehicle. Headlight leveling systems described herein may adjust the pitch angle of at least a portion of headlight 18 to move undesirable beam 26 towards correct beam 20.

Figure 3:
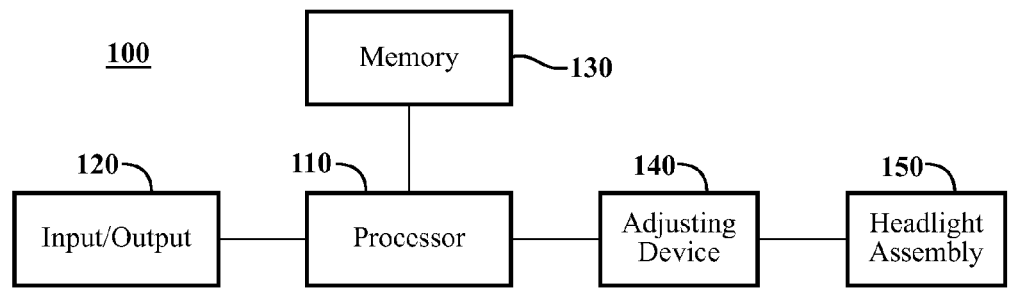
FIG. 3 is a diagram of a headlight leveling system in which the aspects, features, and elements disclosed herein may be implemented.

With reference to FIG. 3, portions of a headlight leveling system 100 may be described. System 100 may include a processor 110 in communication with an input/output device 120 and a memory 130. Processor 110 may be in communication with an adjusting device 140 capable of changing characteristics of a headlight assembly 150. System 100 may further include a power source, such as a vehicle battery or control unit and other communication devices.

Although depicted as separate units, the processor 110, memory 130, input/output 120, or any combination thereof may be integrated in one or more electronic or computing units. For example, processor 110, input/output device 120, and memory 130 may be integrated within an information and entertainment system located in vehicle 10.

The processor 110 may include any device or combination of devices capable of manipulating or processing a signal or other information now-existing or hereafter developed, including optical processors, quantum processors, molecular processors, or a combination thereof. Processor 110 may, for example, be incorporated with a vehicle electronic control unit (ECU) for in-vehicle information or entertainment systems.

Input/output device 120 may include any device adapted to receive input from an occupant of a vehicle or display information while in communication with processor 110, including now-existing or hereafter developed technology. For example, input/output device 120 may be a touch screen or physical controls located in or on a dashboard or instrument cluster of vehicle 10.

The memory 130 may include any tangible non-transitory computer-usable or computer-readable medium, capable of, for example, containing, storing, communicating, or transporting machine readable instructions, or any information associated therewith, for use by or in connection with the processor 110.

In some embodiments, adjusting device 140 may include one or more motor drivers and motors connected to a portion of a headlight assembly, such as headlight housing, reflector, or brackets. The adjusting device 140 may be adapted to convert electric signals from processor 110 to mechanical movements of at least a portion of headlight assembly 150. For example, adjusting device 140 may cause a portion of headlight assembly 150 containing a light source or reflective lens to be angled with respect to a pivot point located within headlight assembly 150.

Headlight assembly 150 may include any exterior light assembly designed to provide illumination in front of a vehicle. Furthermore, headlight assembly 150 may include a variety of light sources such as tungsten, tungsten-halogen, halogen infrared reflective (HIR), high-intensity discharge (HID), and light-emitting diodes (LED). Headlight assembly 150 may include additional safety features, such as directional or steering headlights, automatic beam switching, adaptive front-lighting systems (AFS), dimming systems, and headlight washing systems.

In some embodiments, an occupant of vehicle 10 may input certain loading conditions to system 100 via input/output device 120. For example, an occupant may select different loading options presented via a display unit located within vehicle 10. System 100 may then determine a correct headlight level setting and adjust the headlights of vehicle 10 accordingly.

In some embodiments, system 100 may also prompt occupants of vehicle 10 to enter loading conditions of vehicle 10 in certain circumstances. For example, if system 100 detects a hauling or towing condition, it may prompt a user to enter load conditions and adjust headlight levels. It is contemplated that system 100 may be configured to prompt occupants of a vehicle to input loading conditions at a variety of different times. For example, system 100 may be configured to prompt occupants during each detected loading change such as going from a normal loading condition to hauling or towing and vice versa.

Figure 4:
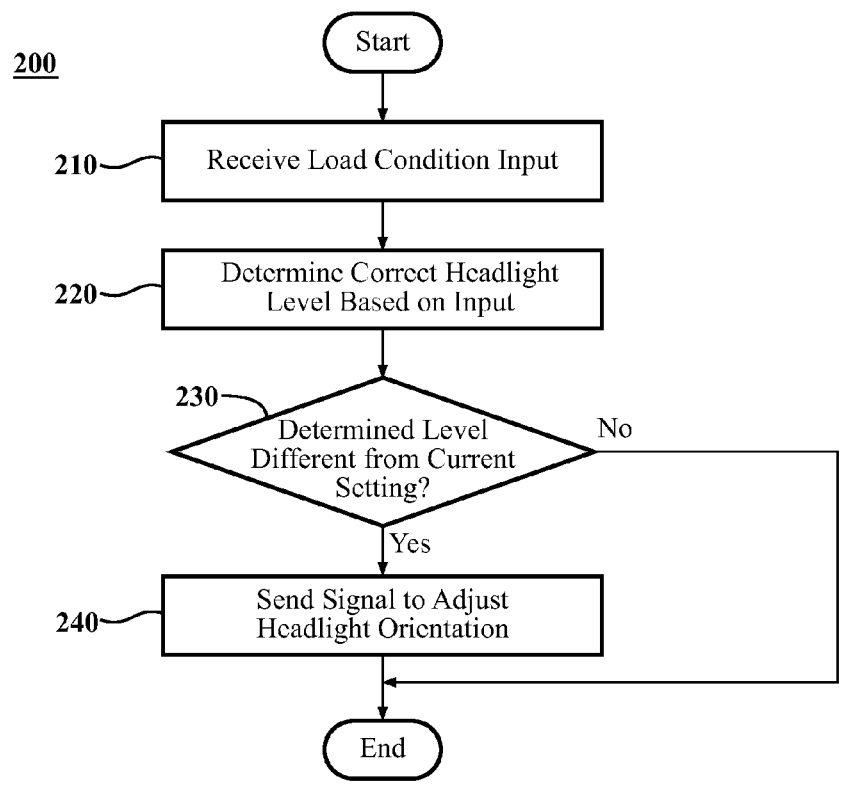
FIG. 4 is a diagram of a method of headlight leveling operations in accordance with this disclosure.

FIG. 4 is a diagram of a method 200 of headlight leveling operations in accordance with this disclosure. In some embodiments, system 100 may receive load condition inputs from an occupant of vehicle 10 at step 210. For example, load conditions may be selected or inputted by an occupant via an in-vehicle display screen.

In some embodiments, system 100 may determine the correct headlight level based on the input received in step 220. For example, processor 110 may determine a level setting based on instructions saved on memory 130 and signals from the input/output device 120 indicative of load conditions selected by the occupant. The instructions saved on memory 130 may include a loading conditions correlation table that correlates loading conditions to leveling settings. The correlation table may include, for example, relationships between different vehicle loading conditions and a headlight leveling setting. The level settings may include discrete values that may correspond to different orientations of headlight assembly 150. Thus, occupants of vehicle 10 would not have to manually look up a correlation table to determine a level setting.

In some embodiments, system 100 may determine whether the correct headlight level is different from a current setting applied to the headlights of vehicle 10 in step 230. If the setting is not different from the current setting, no action need be taken by system 100.

If system 100 determines the correct headlight level setting differs from the current settings, a signal may be sent to adjust headlight orientation in step 240. For example, processor 110 may send a signal to adjusting device 140 indicative of a level setting. Adjusting device 140 may then alter the pitch angle of a portion of headlight assembly 150. For example, adjusting device 140 may pivot or angle a light-emitting portion of headlight assembly 150.

Figure 5:
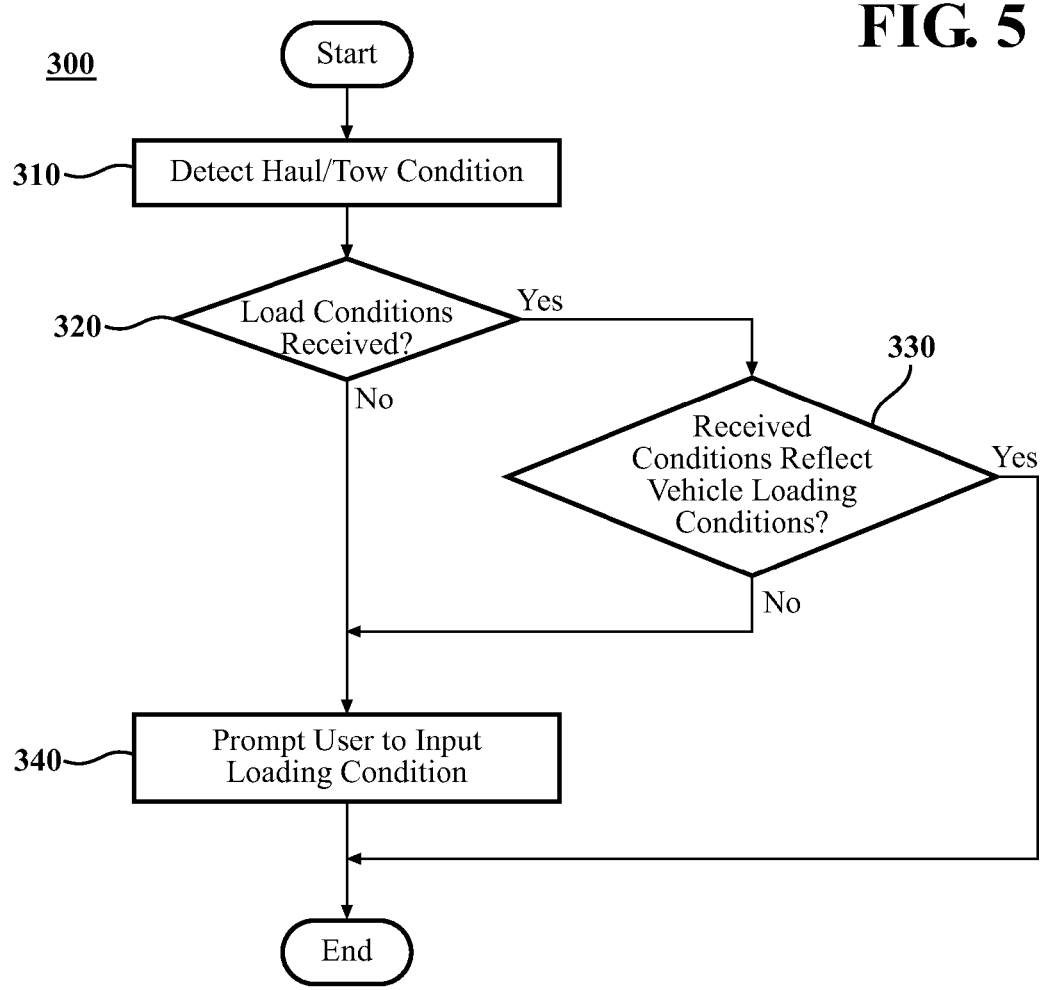
FIG. 5 is a diagram of a method for prompting occupants by the headlight leveling system in accordance with this disclosure.

FIG. 5 is a diagram of a method 300 for prompting occupants by the headlight leveling system in accordance with this disclosure. In some embodiments, system 100 may be adapted to detect haul or towing conditions of vehicle 10 in step 310. System 100 may be able to communicate with in-vehicle systems to detect when vehicle 10 has a different loading condition. For example, it may determine that vehicle 10 is hauling an increased amount of weight or when vehicle 10 is towing an exterior trailer. System 100 may receive signals indicative of electrical connection/disconnection of a trailer, user selecting a tow/haul mode, powertrain or body ECU signals indicative of certain vehicle dynamic performance, etc.

In some embodiments, system 100 may determine, upon detecting of a change in hauling or towing, whether load conditions were received from an occupant of vehicle 10 in step 320. If it is determined that load conditions were not received, system 100 may prompt occupants of vehicle 10 to input loading conditions in step 340. Prompts may include any audial or visual reminder or indication, such as a message displayed on a vehicle display.

If load conditions have been received, system 100 may determine whether the received load conditions reflect the current vehicle loading conditions at step 330. For example, if system 100 detects that vehicle 10 is towing a trailer, it may determine whether or not the load conditions received by an occupant reflect such.

If system 100 determines the received conditions reflect the current loading conditions, no further action may be needed. If the received load conditions do not reflect the current vehicle loading conditions, system 100 may prompt occupants to input loading conditions at step 340.

Figure 6A:
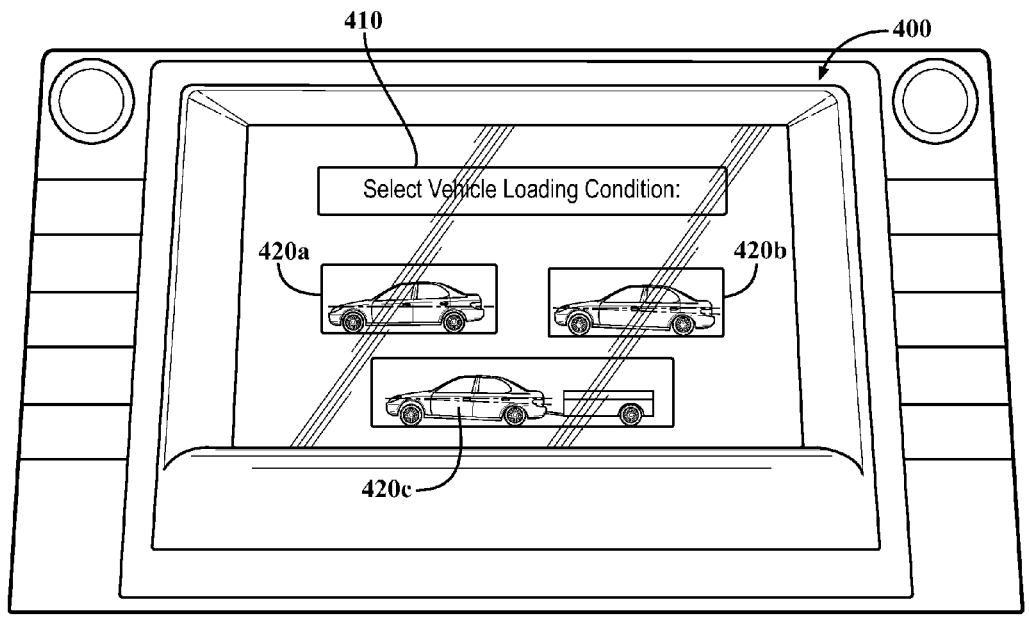
FIGS. 6A-6C are perspective views of a vehicle display input for the headlight leveling system.
Figure 6B:
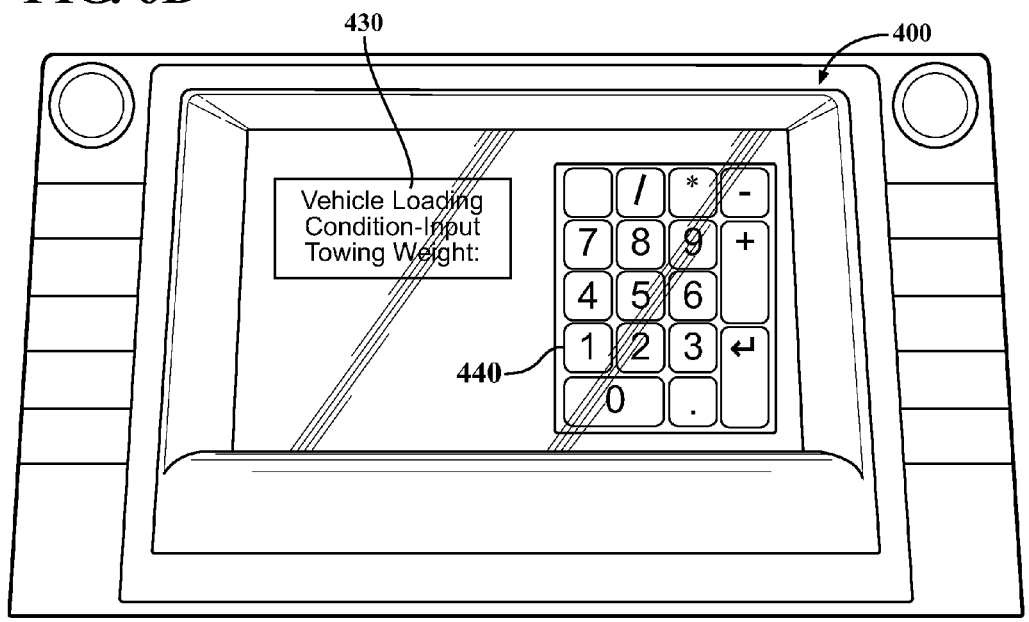
Figure 6C:
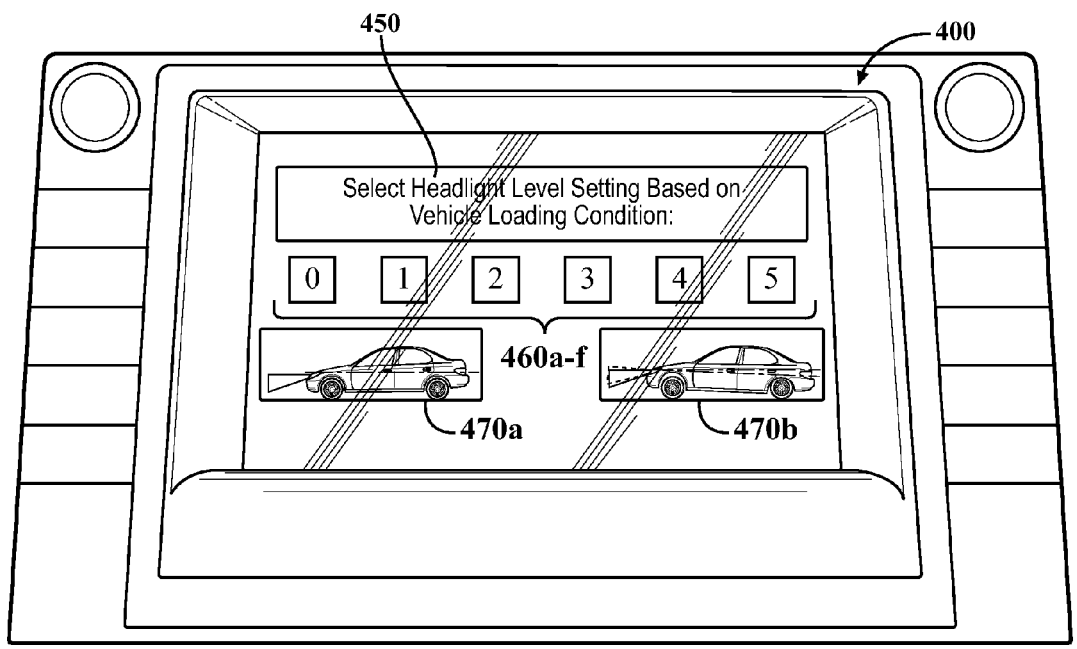

Referring now to FIGS. 6A-6C, perspective views of a vehicle display input for the headlight leveling system are shown. For example, input/output device 120 of system 100 may be the in-vehicle display 400. For example, display 400 may be a touch screen located in the center area of a vehicle dashboard. As shown in FIGS. 6A-6C, display 400 may be adapted to show a variety of textual and visual graphics to allow occupants to intuitively input vehicle loading conditions.

In some embodiments, occupants may input vehicle loading conditions by selecting graphical representations of the conditions of vehicle 10. For example, display 400 may include text prompt 410 and graphics 420*a-c* as shown in FIG. 6A. Text prompt 410 may indicate to an occupant they may select a vehicle loading condition. Graphic 420*a* may represent a normal or typical load condition, graphic 420*b* may indicate a high payload or hauling condition, and graphic 420*c* may indicate a towing condition. The selection of one of graphics 420*a-c* may be the input received by system 100 and processor 110 to determine a correct headlight level setting.

As shown in FIG. 6B, in some embodiments, a vehicle loading condition input may also include the input of a specific weight or weight range that is being towed or hauled. For example, graphic 430 may prompt an occupant to input a specific weight or weight range being towed using touch screen graphic 440.

In some embodiments, a user may input a level setting directly as shown in FIG. 6C. For example, graphic 450 may direct an occupant to enter a level setting by selecting one of the touch screen graphics 460*a-f* corresponding to numbers 0-5. Graphics 470*a-b* may be included to help correlate the level settings to visual representations of vehicle loading conditions.

In addition to the images of FIGS. 6A-6C, it is contemplated that a variety of images, descriptions, and animations may be included to assist occupants in inputting the correct loading conditions.

In some embodiments, system 100 may allow for memory settings for different load conditions. For example, system 100 may receive an input from an occupant of vehicle 10 instructing system 100 to save a particular load condition. System 100 may be adapted to prompt or receive custom naming information correlating to the saved load condition. For example, an occupant may have two trailers that are commonly towed by vehicle 10. System 100 may allow the occupant to save custom load conditions for each trailer and allow the occupant to select the saved custom load conditions rather than the particular load conditions of the vehicle. For example, the loading conditions may be saved in memory 130 and may be selected by an occupant using display 400.

The above-described aspects, examples, and implementations have been described in order to allow easy understanding of the application and are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A headlight leveling system for a vehicle, comprising:
   a vehicle display, the vehicle display being configured to present a plurality of graphics to an occupant of the vehicle, the plurality of graphics representing different loading conditions of the vehicle, the plurality of graphics being selectable by the occupant such that, when one of the plurality of graphic is selected, an input corresponding to the loading condition of the vehicle represented by the selected graphic is received from the occupant;
   a memory with instructions stored therein;
   a processor in communication with the vehicle display and the memory, the processor being configured to:
      receive an input corresponding to a loading condition of the vehicle represented by a selected graphic on the vehicle display;
      compare the received input to a detected current loading condition;
      if the received input reflects the detected current loading condition, determine a headlight level setting based upon the received input and the instructions stored on the memory, and cause an orientation of a light emitting portion of a vehicle headlight assembly to be adjusted based on the determined headlight level setting; and
      if the received input does not reflect the detected current loading condition, causing a prompt to be provided within the vehicle for an additional input relating to the loading condition of the vehicle.

2. The headlight leveling system of claim 1, wherein at least one of the memory and the processor is integrated within the vehicle display.

3. The headlight leveling system of claim 1, wherein the processor is a vehicle electronic control unit (ECU).

4. The headlight leveling system of claim 3, wherein the ECU is a vehicle display ECU.

5. The headlight leveling system of claim 4, wherein the vehicle display is a vehicle touchscreen display.

6. A computing device for a vehicle, comprising:
   a vehicle display, the vehicle display being configured to present at least three graphics representing different vehicle loading conditions to an occupant of the vehicle, the at least three graphics representing different vehicle loading conditions including a normal load condition, a high payload or hauling condition, and a towing condition,
   the at least three graphics being selectable by the occupant such that, when one of the at least three graphics is selected, an input corresponding to the loading condition of the vehicle represented by the selected graphic is received from the occupant;
   one or more processors for controlling operations of the computing device, the one or more processors being operatively connected to the vehicle display; and
   a memory storing data and instructions used by the one or more processors, wherein the one or more processors execute instructions stored in the memory to:
      receive an input corresponding to a loading condition of the vehicle represented by a selected graphic on the vehicle display;
      compare the received input to a detected current loading condition;
      if the received input reflects the detected current loading condition, determine a headlight level setting based on the received input, and cause an orientation of a light emitting portion of a vehicle headlight assembly to be adjusted based on the determined headlight level setting; and
      if the received input does not reflect the detected current loading condition, cause a prompt to be provided within the vehicle for an additional input relating to the loading condition of the vehicle.

7. The computing device of claim 6, wherein the computing device is an electronic control unit (ECU) for the vehicle display.

8. The computing device of claim 6, wherein the one or more processors execute instructions stored in the memory to detect vehicle loading condition changes.

9. The computing device of claim 8, wherein the one or more processors execute instructions stored in the memory to prompt an occupant of the vehicle to input vehicle loading conditions.

10. The computing device of claim 6, wherein the display is a vehicle touchscreen display.

11. The computing device of claim 6, wherein the one or more processors are a vehicle electronic control unit (ECU).

12. The computing device of claim 6, wherein the instructions stored in the memory comprise controlling logic including a loading conditions table.

13. A computer-implemented method for vehicle headlight leveling, comprising:
   detecting a current loading condition of the vehicle;
   receiving from a vehicle occupant an input relating to a vehicle loading condition;
   comparing the detected current loading condition to the received input relating to a vehicle loading condition;
   if the input relating to the vehicle loading condition reflects the detected current loading condition, determining, using one or more processors, a headlight level setting based on the received input, and causing an orientation of a portion of a headlight assembly of a vehicle to be adjusted based on the determined headlight level setting; and
      if the input relating to the vehicle loading condition does not reflect the detected current loading condition, prompting the vehicle occupant to provide an additional input relating to the vehicle loading condition.

14. The computer-implemented method for vehicle headlight leveling of claim 13, wherein the one or more processors determine the headlight level setting based on the received input using instructions stored on a tangible non-transitory computer readable medium, and wherein the instructions include control logic correlating vehicle loading conditions to headlight level settings.

15. The computer-implemented method for vehicle headlight leveling of claim 13, further comprising detecting vehicle loading condition changes.

16. The computer-implemented method for vehicle headlight leveling of claim 13, further comprising prompting the occupant to input a vehicle loading condition.

17. The computer-implemented method for vehicle headlight leveling of claim 16, wherein prompting the occupant to input the vehicle loading condition comprises displaying textual or graphical images on a vehicle display.

18. The computer-implemented method for vehicle headlight leveling of claim 13, wherein receiving from the vehicle occupant the input relating to the vehicle loading condition includes receiving from the vehicle occupant a weight or a weight range being towed by the vehicle.

19. The computer-implemented method for vehicle headlight leveling of claim 13, wherein receiving from the vehicle occupant the input relating to the vehicle loading condition includes receiving from the vehicle occupant a headlight level setting.

\* \* \* \* \*

UNITED STATES PATENT AND TRADEMARK OFFICE
CERTIFICATE OF CORRECTION

Page 1 of 1

PATENT NO. : 9,527,430 B2
APPLICATION NO. : 14/455963
DATED : December 27, 2016
INVENTOR(S) : Christopher M. Higgins and Christopher G. Grant It is certified that error appears in the above-identified patent and that said Letters Patent is hereby corrected as shown below:

In the Claims

In Claim 1, Column 7, Line 63, delete "graphic" and insert --graphics--.

Signed and Sealed this
Ninth Day of January, 2018

Joseph Matal
*Performing the Functions and Duties of the*
*Under Secretary of Commerce for Intellectual Property and*
*Director of the United States Patent and Trademark Office*